(12) United States Patent
Ray (10) Patent No.: US 8,014,341 B1
(45) Date of Patent: Sep. 6, 2011

(54) METHOD AND INTERMEDIARY DEVICE FOR REPORTING A CIVIC ADDRESS DURING AN EMERGENCY CALL

(75) Inventor: Amar Nath Ray, Shawnee, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1520 days.

(21) Appl. No.: 11/430,232

(22) Filed: May 8, 2006

(51) Int. Cl.
*H04W 4/00* (2009.01)

(52) U.S. Cl. .................. 370/328; 455/404.1; 455/404.2; 379/45

(58) Field of Classification Search .................. 370/328, 370/352, 354; 379/33, 45; 455/404, 404.2
See application file for complete search history.

(56) References Cited

U.S. PATENT DOCUMENTS

| | | | |
|---|---|---|---|
| 5,339,351 A * | 8/1994 | Hoskinson et al. | 379/45 |
| 5,555,286 A | 9/1996 | Tendler | |
| 5,937,038 A * | 8/1999 | Bell et al. | 379/93.17 |
| 6,317,049 B1 | 11/2001 | Toubia et al. | |
| 6,366,772 B1 * | 4/2002 | Arnson | 455/415 |
| 6,480,578 B1 * | 11/2002 | Allport | 379/48 |
| 6,526,125 B1 | 2/2003 | Lindsay et al. | |
| 0,169,248 A1 | 8/2005 | Truesdale et al. | |
| 7,079,627 B2 | 7/2006 | Crago et al. | |
| 7,095,733 B1 | 8/2006 | Yarlgadda et al. | |
| 7,231,218 B2 | 6/2007 | Diacakis et al. | |
| 7,269,413 B2 | 9/2007 | Kraft | |
| 7,418,087 B2 | 8/2008 | Luneau et al. | |
| 7,496,189 B2 | 2/2009 | Clarisse et al. | |
| 7,706,356 B1 | 4/2010 | Olshansky et al. | |
| 7,734,019 B1 | 6/2010 | Terpstra | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0136363 A1 * | 9/2002 | Stumer et al. | 379/45 |
| 2003/0063714 A1 | 4/2003 | Stumer et al. | |
| 2003/0133450 A1 | 7/2003 | Baum | |
| 2004/0072583 A1 | 4/2004 | Weng | |
| 2004/0176123 A1 | 9/2004 | Chin et al. | |
| 2005/0003797 A1 | 1/2005 | Baldwin | |

(Continued)

OTHER PUBLICATIONS

Dale N. Hatfield, A Report on technical and Operational Issues Impacting the Provision of Wireless Enhanced 911 Services, Federal Communications Commission, printed from the World Wide Web on May 8, 2006.

(Continued)

*Primary Examiner* — Jung Park
(74) *Attorney, Agent, or Firm* — SNR Denton US LLP (57) ABSTRACT

Methods and an intermediary device are disclosed for sending a civic address and other information from the intermediary device to an apparatus associated with a predefined number (such as Public Safety Answering Point). The civic address may include a street number, street name, street type, and postal mailing code, all of which may be associated with a wireless calling access line assigned to the intermediary device. A calling mechanism (e.g., a telephone) operating in an off-hook state initiates a communication with the apparatus. The intermediary device may enter the off-hook state in response to the calling mechanism entering the off-hook state. The intermediary device can continue to operate in the off-hook state so as to send the civic address to the apparatus (e.g., a PSAP) even if the calling mechanism switches to an on-hook state prior to the civic address being sent to the apparatus.

19 Claims, 5 Drawing Sheets

U.S. PATENT DOCUMENTS

| | | |
|---|---|---|
| 2005/0101287 A1 | 5/2005 | Jin et al. |
| 2005/0209781 A1 | 9/2005 | Anderson |
| 2006/0052134 A1 | 3/2006 | Sato |
| 2006/0133582 A1 | 6/2006 | McCulloch |
| 2006/0217136 A1 | 9/2006 | Bantukul et al. |
| 2006/0219542 A1 | 10/2006 | Savir |
| 2006/0293024 A1 | 12/2006 | Benco et al. |
| 2007/0003024 A1 | 1/2007 | Olivier et al. |
| 2007/0201391 A1 | 8/2007 | Belmonte et al. |
| 2007/0273519 A1 | 11/2007 | Ichikawa et al. |
| 2007/0280428 A1 | 12/2007 | Mcclelland |
| 2009/0197567 A1 | 8/2009 | Ogram |
| 2009/0227225 A1 | 9/2009 | Mitchell et al. |
| 2009/0310602 A1 | 12/2009 | Olshansky et al. |
| 2010/0098062 A1* | 4/2010 | Croak et al. .................. 370/352 |
| 2010/0291894 A1 | 11/2010 | Pipes |

OTHER PUBLICATIONS

ANSI, TIA Standard, Telecommunications telephone Terminal Equipment Caller Identity and visual Message Waiting Indicator Equipment Performance Requirements, TIA-777-A, Revision of TIA/EIA-777, May 2003.

Melabs, Micro Engineering Labs, Inc., Caller ID, http:/www. melabs,com/resources/callerid.htm, printed from the World Wide Web on Apr. 24, 2006.

Dave Ryan & Asher Hazanchuk, On-Hook & Off-Hook Caller ID using DSP, Circuit Cellular INK #83, Jun. 1997.

Ittiam Systems, Caller Identification (CLI or Caller ID), http://www.ittiam.com/pages/products/cid.htm, downloaded from the World Wide Web on Apr. 24, 2006.

Response filed Nov. 2, 2010 for U.S. Appl. No. 11/891,784.

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.

* cited by examiner

METHOD AND INTERMEDIARY DEVICE FOR REPORTING A CIVIC ADDRESS DURING AN EMERGENCY CALL

FIELD OF INVENTION

The present invention relates to telecommunications, and more particularly, to location determination in connection with emergency services calls or other location-based-services calls.

DESCRIPTION OF RELATED ART

In the United States and many other countries, when a person places an emergency call (e.g., a 911 call) seeking emergency assistance, the operator who answers the call is typically presented with an indication of the caller's location, thereby enabling the operator to promptly dispatch emergency personnel to the caller's location. In traditional landline telephony, the caller's location is determined by querying a telephone line identification database that maintains and sets correlation between telephone numbers and subscriber street addresses (where the telephone numbers are registered for services).

As advancements in cellular wireless telephony continue to occur, many providers of traditional landline telephone service are planning to provide service to their customers via "fixed wireless service" (sometimes referred to as a "wireless local loop"). Fixed wireless service may involve the use an intermediary device (e.g., a fixed wireless node located at a customer's premises) to provide connectivity to a wireless network and, in turn, a wireline network. The customer receiving fixed wireless service is to be provided with the same level of service expected from traditional landline telephone service, including the service of providing the caller's location to an emergency services operator during an emergency call.

Cellular wireless telephony provides a unique set of problems related to conveying a caller's location to a called party during a telephone call. For instance, providing the location of a caller using a fixed wireless communication device may be problematic because the fixed wireless communication device is not connected to a telephone line listed in the telephone line identification database for traditional telephony systems. To overcome this limitation, the wireless network operated by a wireless service provider may include a database that maintains location information of fixed wireless communication devices. This database may be queried to determine the location of the caller using the fixed wireless communication device. However, the cost of maintaining the database, as well as the cost associated with accessing the database each time a caller's location is needed, reduces the profitability of the wireless service provider. Therefore, an improved means for providing the location of a caller using a fixed wireless communication device is desirable.

SUMMARY

The present invention relates to sending a civic address from an intermediary device to an apparatus associated with a predefined number (e.g., a Public Safety Answering Point (PSAP)). The present invention helps solve problems with the prior art by using the intermediary device to maintain a civic address and send the civic address directly to the apparatus associated with the predefined number. In this way, the apparatus can receive the civic address without having to query a network database. Moreover, the intermediary device may send the civic address to the apparatus even though a calling mechanism (e.g., a telephone) connected to the intermediary device is operating in an on-hook state.

In one respect, an exemplary embodiment of the present invention may take the form of a method carried out in an intermediary device residing in a communication path between a calling mechanism and a wireless local loop. The method may include: (i) detecting the calling mechanism dialing a predefined number, and responsively establishing a communication between the calling mechanism and an apparatus associated with the predefined number, and (ii) after the calling mechanism has switched to an on-hook state, sending frequency shift keying (FSK) signals to the wireless local loop for transmission, in turn, to the apparatus associated with the predefined number. The FSK signals preferably represent a civic address associated with the calling mechanism. The civic address may include (i) a street number, (ii) a street name, (iii) a street type, and (iv) a postal mailing code.

In another respect, an exemplary embodiment of the present invention may take the form of an intermediary device that includes: (i) a communication unit having a first interface for interfacing with a first network that provides connectivity to a calling mechanism, and a second interface for interfacing with a second network that provides connectivity to an apparatus associated with a predefined number, (ii) a processor, and (iii) data storage. The data storage contains program logic executable by the processor to: (i) detect the calling mechanism dialing the predefined number, and responsively invoke the communication unit to establish a communication with the apparatus associated with the predefined number; and (ii) after the calling mechanism switches to an on-hook state, invoke the communication unit to send a civic address to the apparatus associated with a predefined number.

In yet another respect, an exemplary embodiment of the present invention may be carried out as a method in a system comprising a calling mechanism operable in a calling mechanism on-hook state and a calling mechanism off-hook state, and an intermediary device operable in an intermediary device on-hook state and an intermediary device off-hook state. The method may include: (i) switching the calling mechanism to the calling mechanism off-hook state, and responsively switching the intermediary device to the intermediary device off-hook state, (ii) thereafter, using the calling mechanism to dial an emergency number, and responsively establishing a communication via the intermediary device between a Public Safety Answering Point (PSAP) and the calling mechanism, (iii) after establishing the communication and before the intermediary device sends a civic address to the PSAP, switching the calling mechanism to the calling mechanism on-hook state, and (iv) after switching the calling mechanism to the calling mechanism on-hook state, sending the civic address from the intermediary device to the PSAP, and thereafter switching the intermediary device to the intermediary device on-hook state.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention is directed to methods and an intermediary device for sending a civic address from the intermediary device to an apparatus associated with a predefined number. The intermediary device can send the civic address while the intermediary device is in an off-hook state and a calling mechanism (associated with the intermediary device) is in an on-hook state. In one exemplary embodiment, the apparatus may be located at a PSAP, the calling mechanism may be located at a given civic address and may comprise a landline telephone connected to the intermediary device, and the intermediary device may be located at the given civic address. In accordance with this embodiment, the intermediary device can send the given civic address to the apparatus while the calling mechanism is operating in the on-hook state, and, in turn, the apparatus can display the given civic address.

Prior to sending the civic address from the intermediary device to the apparatus, the intermediary device can receive the civic address from another entity (e.g., the calling mechanism). The intermediary device can maintain the civic address in data storage. Maintaining the civic address within the intermediary device allows for the intermediary device to send the civic address directly to the apparatus. In this way, the apparatus does not have to query a network database to determine the civic address associated with the calling mechanism.

2. Exemplary Architecture

Figure 1:
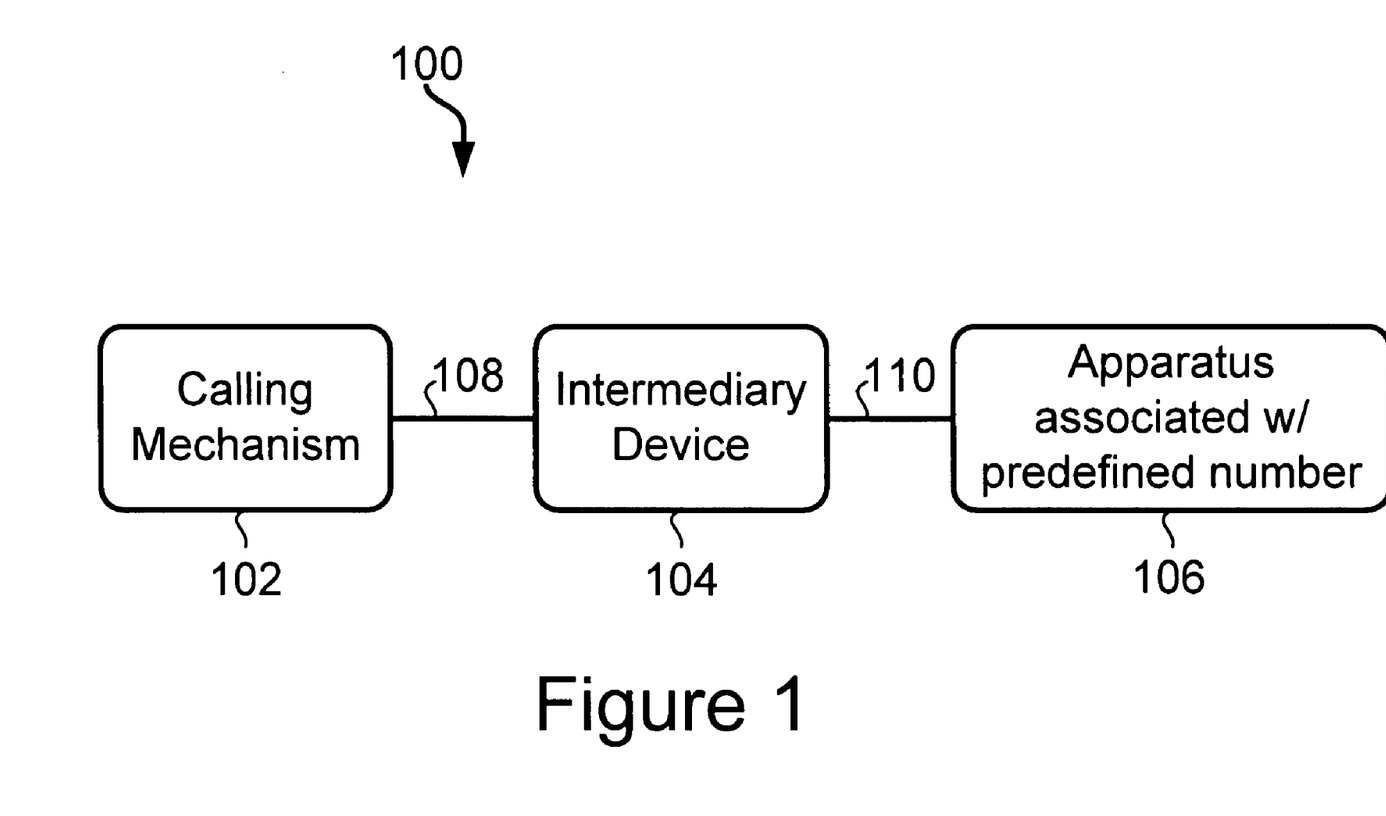
FIG. 1 illustrates an exemplary system for carrying out the invention.

FIG. 1 is a block diagram of a system 100 for carrying out the present invention. As shown in FIG. 1, the system 100 includes a calling mechanism 102, an intermediary device 104, an apparatus (associated with a predefined number) 106, a first network 108, and a second network 110.

The calling mechanism 102 interfaces to the first network 108 so as to communicate with the intermediary device 104. The first network 108 may be arranged as any network capable of carrying communications between the calling mechanism 102 and the intermediary device 104. For instance, the first network 108 may include a twisted pair of copper wires, an optical fiber, a coaxial cable, an Ethernet, or a T1/E1 line. The first network 108 may provide means for the intermediary device 104 to interface to one or more other calling mechanisms (not shown). Other examples of the first network 108 are also possible.

Communications sent over the first network 108 from the calling mechanism 102 to the intermediary device 104 may, in turn, be sent over the second network 110 from the intermediary device 104 to the apparatus 106. As an example, the communications may consist of telephone call voice traffic and/or telephone call data traffic. As another example, the communications may consist of a Point-to-Point Protocol (PPP) data session traffic. As yet another example, the communications may consist of signals such as call setup signals, call progress tones, or call release signals. Other examples of the communications are also possible.

The calling mechanism 102 can participate in communications that the calling mechanism 102 initiates, as well as communications initiated by another entity (e.g., the apparatus 106). The calling mechanism 102 provides means for a caller to dial numbers, and for responsively sending signals representing the dialed numbers to the intermediary device 104 over the first network 108. As an example, the calling mechanism 102 may comprise an analog landline telephone such as a Plain Old Telephone System (POTS) telephone, or a digital telephone such as a Session Initiation Protocol (SIP) telephone that is connected to the intermediary device 104 via a signal gateway that converts SIP signals to POTS telephone signals. As another example, the calling mechanism 102 may comprise an Intranet Private Branch eXchange (IPBX) extension (e.g., a telephone connected to an IPBX server). In accordance with this latter example, the intermediary device 104 may be arranged as the IPBX server. Other examples of the calling mechanism 102 are also possible.

The calling mechanism 102 is operable in (i) a calling mechanism on-hook state, i.e., a state in which the calling mechanism 102 is not in use for communication, and (ii) a calling mechanism off-hook state, i.e., a state in which the calling mechanism 102 is in use for communication. The calling mechanism 102 may switch between these two states by changing an amount of resistance between electrical circuits that connect with the calling mechanism 102 (e.g., a tip circuit and a ring circuit).

The calling mechanism 102 may switch to the calling mechanism on-hook state in response to any of a variety of events. For example, the calling mechanism 102 may switch to the calling mechanism on-hook state when a handset of the calling mechanism 102, in a case in which the calling mechanism 102 comprises a telephone, is hung up (e.g., the handset is placed into a handset cradle). As another example, the calling mechanism 102 may switch to the calling mechanism on-hook state when a circuit providing connectivity between the calling mechanism 102 and the intermediary device 104 becomes open-circuited. For instance, the circuit could become open-circuited when a person purposely cuts the circuit in an attempt to prevent a caller from making an emergency call. Other examples of an event that causes the calling mechanism 102 to switch to the calling mechanism on-hook state are also possible.

The calling mechanism 102 may switch to the calling mechanism off-hook state in response to any of a variety of events. For example, the calling mechanism 102 may switch to the calling mechanism off-hook state when a handset of the calling mechanism 102, in a case in which the calling mechanism 102 comprises a telephone, is removed from a handset cradle. Other examples of an event that causes the calling mechanism 102 to switch to the calling mechanism off-hook state are also possible.

The intermediary device 104 may be arranged as a fixed wireless communication device (e.g., a wireless local loop home hub or docking station). The intermediary device 104 may provide signaling to the calling mechanism 102, such as the signaling typically provided by a landline telephony system (e.g., signaling provided from a Subscriber Line Interface Circuit (SLIC) card). In this regard, the intermediary device 104 may function as a SLIC card emulator to provide signals sent from the second network 110 and/or the apparatus 106. As an example, the intermediary device 104 may provide the calling mechanism 102 with signaling such as (i) direct current supervision signals, (ii) ring signals, (iii) caller identification signals that identify callers from remote telephones calling the calling mechanism 102, and (iv) call progress tones such as a dial tone or a busy tone.

The intermediary device 104 may receive from the calling mechanism 102 signals that would typically be sent to a SLIC card in a traditional landline telephony system. For example, the intermediary device 104 may receive from the calling mechanism 102 Dual Tone Multiple Frequency (DTMF) signals or flash signals. In response to receiving signals from the calling mechanism 102, the intermediary device 104 may generate appropriate signaling to send over the second network 110, such as signaling for call setup, call progress tones, or call release.

The intermediary device 104 functions as a bridge so as to carry out communications between the calling mechanism 102 and the apparatus 106. The intermediary device 104 interfaces to the first network 108 so as to communicate with the calling mechanism 102 and interfaces to the second network 110 so as to communicate with the apparatus 106. The second network 110 carries communications between the intermediary device 104 and the apparatus 106 (or another entity connected to the second network 110 and that can communicate with the intermediary device 104). Communications received at the intermediary device 104 from the apparatus 106 are sent to the calling mechanism 102. Communications received at the intermediary device from the calling mechanism 102 are sent to the apparatus 106.

The intermediary device 104 is operable in (i) an intermediary device on-hook state, i.e., a state in which the intermediary device 104 is not in use for communication, and (ii) an intermediary device off-hook state, i.e., a state in which the intermediary device 104 is in use for communication. As an example, the intermediary device 104 may switch to the off-hook state in response to the intermediary device 104 detecting that the calling mechanism 102 has switched to the off-hook state. As another example, the intermediary device 104 may switch to the on-hook state after sending a civic address to the apparatus 106. Other examples of when the intermediary device 104 switches to the on-hook state or to the off-hook state are also possible.

The apparatus 106 is associated with a predefined number. As an example, the predefined number may consist of an emergency number (e.g., 911) that is associated with a PSAP. As another example, the predefined number may consist of a number associated with a wired local loop of a landline telephony system, such as a seven digit number associated with a wired local loop that runs from a local exchange carrier central office to a police station or fire station. Other examples of the predefined number associated with the apparatus 106 are also possible.

The apparatus 106 may be arranged in any of a variety of configurations. For example, the apparatus 106 may be arranged as a PSAP controller (or more simply PSAP) and one or more work stations in communication with the PSAP controller. As another example, the apparatus 106 may be arranged as a telephone. In both of these examples, the apparatus 106 may include a Type-2 Caller ID instrument capable of displaying a civic address, as well as other data, sent in a message from the intermediary device 104. A Type-2 Caller ID instrument may function in accordance with TIA Standard TIA-777-A, Caller Identity and Visual Message Waiting Indicator Equipment Performance Requirements, May 1, 2003, which is incorporated herein by reference for all purposes.

As an example, the apparatus 106 may receive a message that includes a civic address, a date and time, and a calling number associated with the calling mechanism 102 and/or the intermediary device 104. The apparatus 106 may display the civic address, the date and time, and the calling number on the Type-2 Caller ID instrument.

If the apparatus 106 does not include a Type-2 Caller ID instrument, such an instrument may be added to the apparatus 106 (e.g., the PSAP) by connecting the instrument to the apparatus 106. The Type-2 Caller ID instrument may be connected to the apparatus 106 by connecting the instrument in a parallel circuit format using a wired portion of the second network 110.

Figure 2:
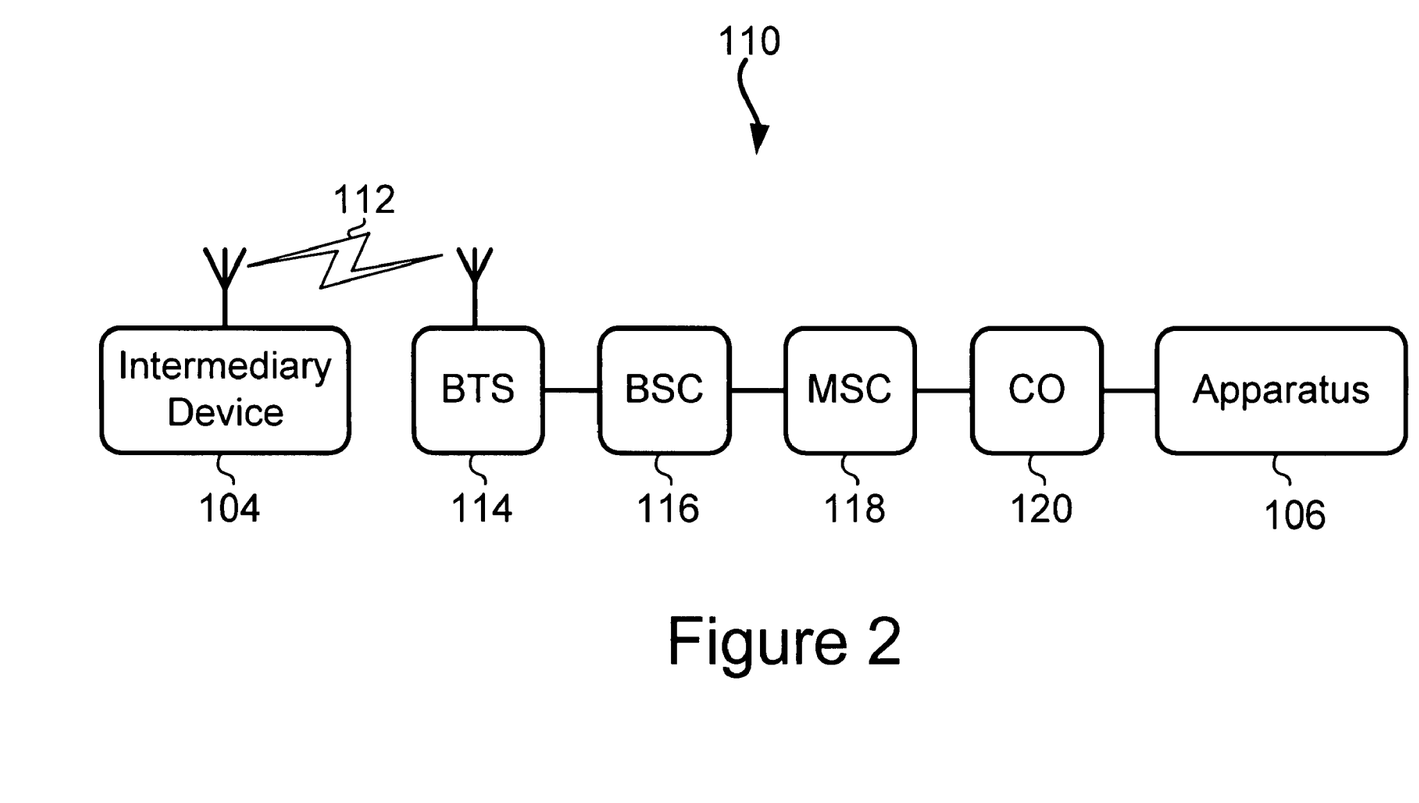
FIG. 2 depicts details of an exemplary network for carrying out the invention.

Next, FIG. 2 depicts an exemplary embodiment of the second network 110. In FIG. 2, the second network 110 includes an air interface 112, a base transceiver station (BTS) 114, a base station controller (BSC) 116, a mobile switching center (MSC) 118, and a central office (CO) 120. One of ordinary skill in the art will understand that the second network 110 may include additional entities not shown in FIG. 2, such as one or more additional base transceiver stations. Other examples of the second network 110 are also possible.

The intermediary device 104 and the BTS 114 communicate with each other by using the air interface 112. The air interface 112 may function as a wireless local loop for the intermediary device 104 and any calling mechanisms in communication with the intermediary device 104. The air interface 112 may carry out communications using any of a variety of air interface protocols such as a Code Division Multiple Access (CDMA) protocol, or a Time Division Multiple Access (TDMA) protocol. Other examples of an air interface protocol are also possible. The BTS 114 can communicate with one or more other wireless communication devices (not shown) such as one or more other fixed wireless communication devices and/or one or more mobile wireless communication devices (e.g., a mobile cellular phone).

The BSC 116 may perform many functions, such as (i) managing the use of the BTS 114, (ii) controlling the handoff of mobile wireless communication devices from the BTS 114 to another BTS as the wireless communication devices move from one wireless network cell to another wireless network cell, and (iii) providing a connection interface to a gateway, such as a Packet Data Serving Node (PDSN) that provides connectivity to a packet-switched network.

The PDSN can facilitate establishing, maintaining, and terminating a point-to-point protocol (PPP) link between the intermediary device 104 and the PDSN. After establishing a PPP link, the intermediary device 104 can communicate with an entity on the packet-switched network for such purposes as receiving a civic address to be maintained in the intermediary device 104. As an example, the entity on the packet-switched network could be a network computer functioning as a server.

The MSC 118 is a switch that provides connectivity between the CO 120 and the BTS 114 and/or the BSC 116. The CO 120 is a switch operated by a local exchange carrier. The MSC 118 can provide connectivity to one or more trunk lines that provide connectivity to the CO 120. The CO 120, in turn, can provide connectivity between the one or more trunk lines and a wired local loop or trunk line connected to the apparatus 106.

Figure 3:
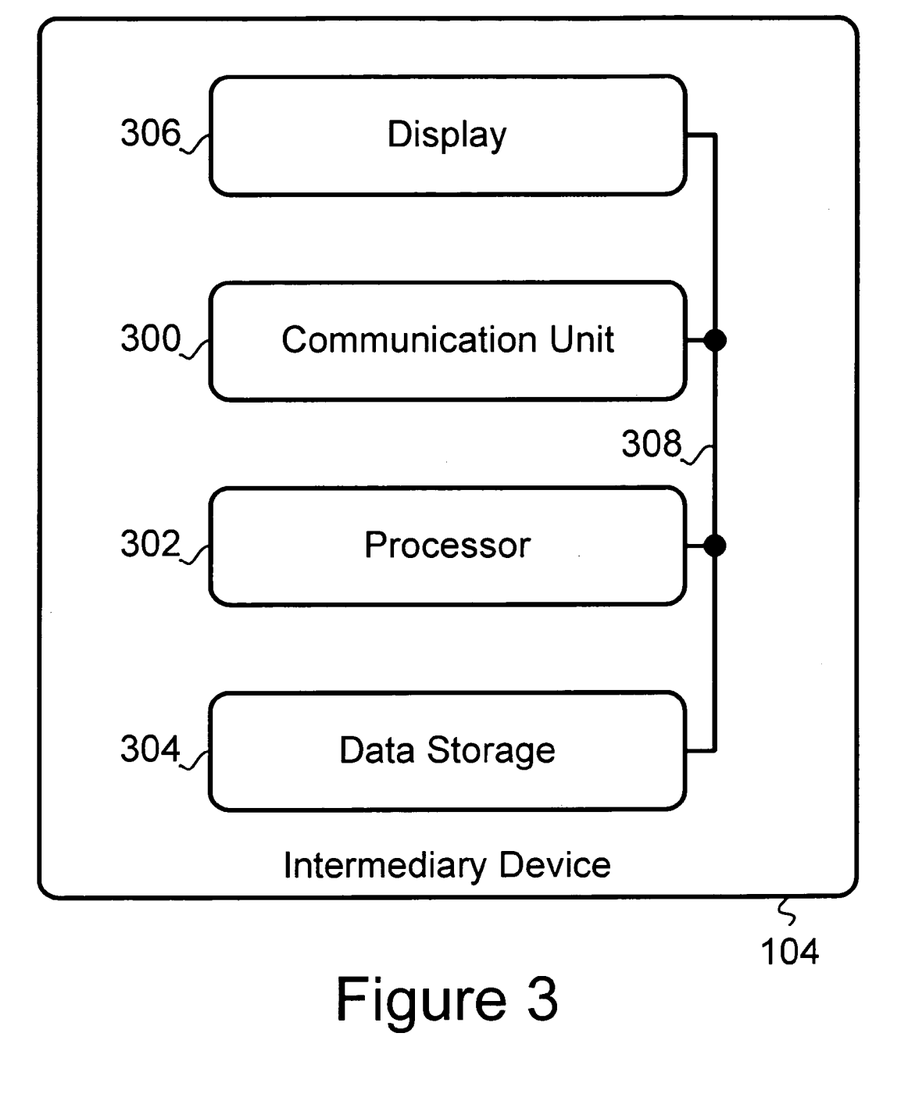
FIG. 3 is a block diagram of an exemplary intermediary device.

Next, FIG. 3 is a block diagram of the intermediary device 104. As shown in FIG. 3, intermediary device 104 includes a communication unit 300, a processor 302, data storage 304, and a display 306, all linked together via a system bus, network, or other connection mechanism 308. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, or as any suitable combination of hardware, firmware, and/or software.

The communication unit 300 may interface to a plurality of networks so as to provide means for communicating to and from the intermediary device 104. As an example, the communication unit 300 may include (i) a first interface for interfacing to the first network 108 (i.e., a network that provides connectivity to the calling mechanism 102), and (ii) a second interface for interfacing with the second network 110 (i.e., a network that provides connectivity to the apparatus 106).

The processor 302 may comprise one or more processors (e.g., a general purpose processor and/or a digital signal processor). The processor 302 provides means for executing computer-readable program instructions. Execution of the computer-readable program instructions may occur to carry out the functions described herein.

The data storage 304 comprises a computer-readable medium readable by the processor 302. The computer-readable medium may comprise volatile and/or non-volatile storage components, such as optical, magnetic, organic or other memory or disc storage, which can be integrated in whole or in part with the processor 302. Alternatively, the entire computer-readable medium may be remote from the processor 302. A remote computer-readable medium may communicate with the processor 302 via the connection mechanism 308.

The data storage 304 may store various types of data. For instance, the data storage 304 may store one or more civic addresses. Each civic address may be associated with (i) the calling mechanism 102, (ii) the intermediary device 104, and/or (iii) a calling access line associated with the calling mechanism 102 and/or the intermediary device 104 (e.g., a particular wireless local loop). Details of an exemplary civic address are described below with respect to FIG. 5.

The data storage 304 may store computer-readable program instructions executable by the processor 302. For example, the data storage 304 may store program instructions executable by the processor 302 for (i) detecting the calling mechanism 102 dialing a predefined number, and responsively invoking the communication unit 300 to establish a communication with the apparatus 106, and (ii) after the calling mechanism 102 has switched to the calling mechanism on-hook state, invoking the communication unit 300 to send a civic address to the apparatus 106 (by way of the second network 110).

As another example, the data storage 304 may store program instructions executable by the processor 302 for causing the intermediary device 104 to operate in a programming mode. In one respect, the programming mode allows the intermediary device 104 to become programmed with a civic address before the intermediary device 104 is used to communicate with the apparatus 106. For instance, while the intermediary device 104 is operating in the programming mode, the calling mechanism 102 (or another entity) may send a civic address to the communication unit 300, the communication unit 300 may receive the civic address, and the processor 302 may execute program instructions that cause the received civic address to be sent to the data storage 304 and responsively stored at the data storage 304.

As yet another example, the data storage 304 may store program instructions executable by the processor 302 to read a civic address stored at the data storage 304, and to convert the civic address as stored in the data storage into a form that can be transmitted over the second network 110. For instance, the civic address stored in the data storage 304 may be converted to a civic address into a Multiple Data Message Format (MDMF) and/or into a Frequency Shift Keying (FSK) signals. The MDMF format is described below with reference to FIG. 5. Other examples of program instructions storable in the data storage 304 are also possible.

The display 306 provides means for displaying information to a user of the intermediary device 104. For example, the display 306 may display a civic address when a user is using the calling mechanism 102 (or another entity) to enter the civic address. In this way, the user may look at the display 306 to confirm that the civic address is being entered correctly. As another example, the display 306 may display a civic address after a user has entered the civic address. In this way, the user may look at the display 306 to confirm that the civic address received by the intermediary device 104 is correct. As yet another example, the display 306 may display instructions on how to use the calling mechanism 102 to enter a civic address, or to confirm that a civic address selected from a plurality of civic addresses stored in the data storage 304 matches the civic address where the intermediary device 104 is located. Other examples of information that may be displayed on the display 306 are also possible.

The display 306 may comprise any of a variety of displays. For example, the display 306 may comprise a Liquid Crystal Display (LCD), a Cathode Ray Tube (CRT) display, or an Organic Light Emitting Diode (OLED) display. Moreover, the display 306 may include more than one display (e.g., a first LCD display and a second LCD display). Other examples of the display 306 are also possible.

3. Exemplary Operation

Figure 4:
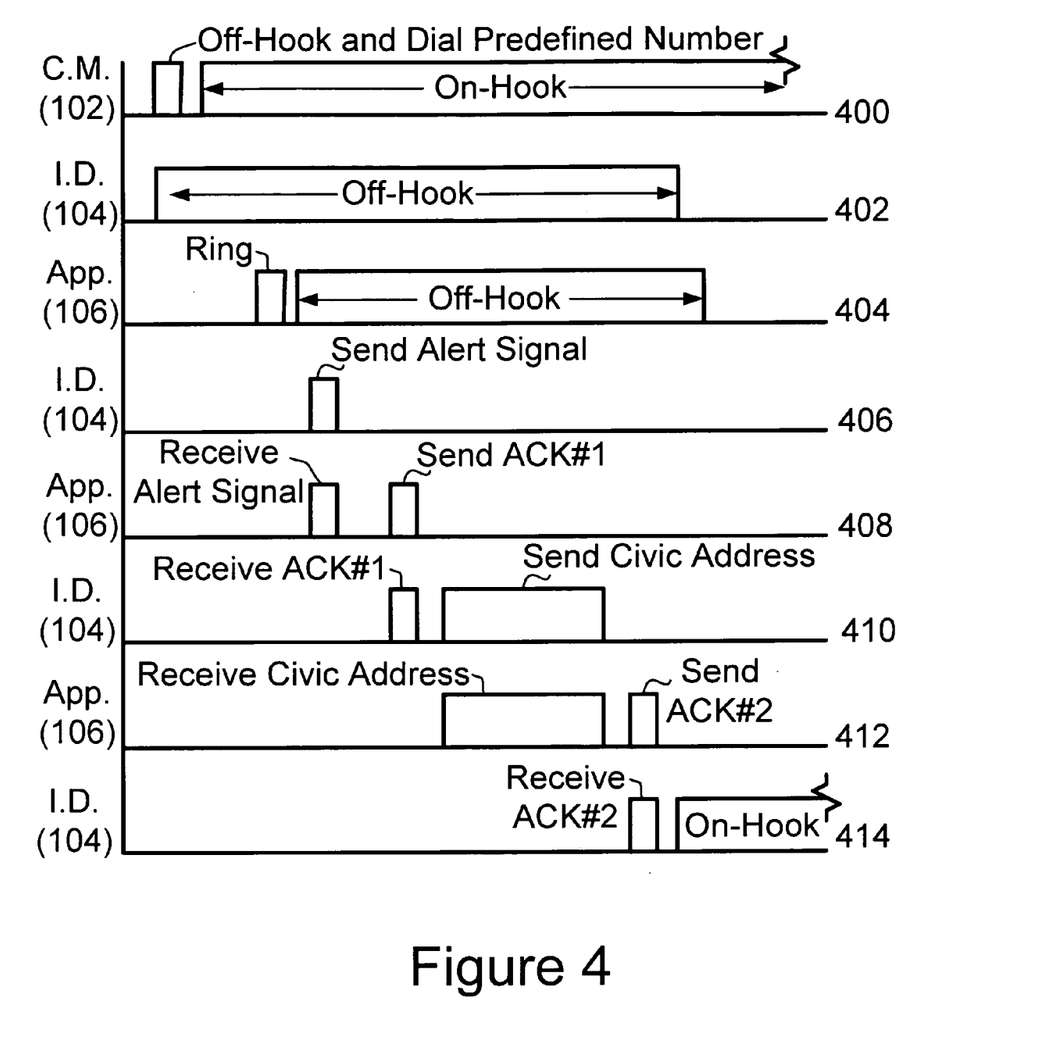
FIG. 4 is a chart provided to illustrate some of the functions that may be carried out in accordance with exemplary embodiments of the present invention.

FIG. 4 is a chart provided to illustrate some of the functions that may be carried out in accordance with exemplary embodiments of the present invention. The functions shown in FIG. 4 may be carried out in an order as shown in the figure (i.e., from top to bottom). Moreover, one or more of the functions shown in FIG. 4 may be omitted, and/or two or more of the functions shown in FIG. 4 may be carried out simultaneously.

At line 400, the calling mechanism 102 switches to a calling-mechanism off-hook state. While the calling mechanism 102 operates in the calling-mechanism off-hook state, a predefined number is dialed at the calling mechanism 102. The predefined number may be associated with the apparatus 106. The calling mechanism 102 sends the predefined number to the intermediary device 104. After the calling mechanism 102 dials the predefined number and before the intermediary device 104 sends a civic address to the apparatus 106 at line 410, the calling mechanism 102 switches from the calling-mechanism off-hook state to a calling-mechanism on-hook state.

As an example, the switching of the calling mechanism 104 from the calling mechanism off-hook state to the calling mechanism on-hook state may take place after the communication is established between the intermediary device 104 and the apparatus 106. As another example, the switching of the calling mechanism 104 from the calling mechanism off-hook state to the calling mechanism on-hook state may take place after the intermediary device 104 has started to send the civic address. Other examples of when the calling mechanism 104 switches from the calling mechanism off-hook state to the calling mechanism on-hook state are also possible.

Next, at line 402, the intermediary device 104 switches to an intermediary-device off-hook state. The intermediary device 104 may detect the calling mechanism 102 switching to the calling-mechanism off-hook state, and in response, switch the intermediary device 104 to the intermediary-device off-hook state. The intermediary device 104 may switch to the off-hook state and the calling mechanism 102 may change to the off-hook state at substantially the same time.

After switching to the intermediary-device off-hook state, the intermediary device 104 may initiate a communication to the apparatus 106. The intermediary device 104 may initiate the communication by sending a call setup request to the second network 110. The second network 110 may process the call setup request and send a ring signal to the apparatus 106.

Next, at line 404, the apparatus 106 may receive the ring signal from the second network 110 so as to provide notice to a user of the apparatus 106 that an incoming communication has been placed to the apparatus 106. The apparatus user may answer the incoming communication by switching the apparatus 106 to an apparatus off-hook state. Switching the apparatus 106 to the apparatus off-hook state allows the communication to be established between the intermediary device 104 and the apparatus 106.

In one respect, if the calling mechanism 102 is operating in the calling-mechanism on-hook state when the communication is initiated, then the communication may be established between (i) the apparatus 106, and (ii) the intermediary device 104. If the calling mechanism 102 switches to the calling-mechanism off-hook state while the communication is established between the apparatus 106 and the intermediary device 104, then the intermediary device 104 may function as a bridge so that the calling mechanism 102 can communicate with the apparatus 106.

In another respect, if the calling mechanism is operating in the calling-mechanism off-hook state when the communication is initiated, then the intermediary device 104, functioning as a bridge, may establish a communication between the apparatus 106 and the calling mechanism 102. The intermediary device 104 and the apparatus 106 may continue the communication (between the intermediary device 104 and the apparatus 106) even if the calling mechanism 102 switches to the on-hook state during the communication.

Next, at line 406, the intermediary device 104 sends an alert signal to the second network 110 for transmission, in turn, to the apparatus 106. The alert signal may be used to determine whether the apparatus 106 is ready to receive a civic address. As an example, the alert signal may be arranged as a Customer Premises Equipment (CPE) Alerting Signal (CAS) that informs a Type-2 CPE that there is a Call-Waiting (e.g., the communication initiated by the calling mechanism 102). The CAS may consist of a dual tone signal. Table 1 recites various parameters for the CAS and possible values for the various parameters.

TABLE 1

CAS Parameter Limits

| Parameter | Value |
| --- | --- |
| Low Tone Frequency | 2130 Hz ± 0.5% |
| High Tone Frequency | 2750 Hz ± 0.5% |
| Dynamic Range (dBm per tone) | −14 to −32 dBm |
| Power Differential within Dynamic Range (Twist) | ±6 dB |
| Signal Duration | 80 ms ± 5 ms |

Next, at line 408, the apparatus 106 receives the alert signal sent from the intermediary device 104, and responsively sends a first acknowledgement signal ("ACK #1") to the first network 110 for transmission, in turn, to the intermediary device 104. The first acknowledgement signal may indicate that (i) the communication between the intermediary device 104 and the apparatus 106 is established, (ii) the apparatus 106 has received the alert signal, and/or (iii) the apparatus 106 is ready to receive a civic address from the intermediary device 104.

As an example, the first acknowledgement signal may consist of a dual tone signal arranged as a DTMF-D signal. A DTMF D signal may consist of a low tone frequency of approximately 941 Hz and a high tone frequency of approximately 1,633 Hz. The DTMF signals described herein preferably meet the requirements of ANSI/TIA/EIA-470-B-1997, Telephony Instruments with Loop Signaling, which is incorporated herein by reference for all purposes. The intermediary device 104 may execute program instructions to interpret the first acknowledgement signal and other tones sent from the apparatus 106.

Next, at line 410, the intermediary device 104 receives the first acknowledgement sent from the apparatus 106. The first acknowledgement may be used to indicate that the apparatus 106 has received the alert signal sent at line 408. In response to receiving the first acknowledgement, the intermediary device 104 may send a message including a civic address to the second network 110 for transmission, in turn, to the apparatus 106. The message including the civic address may be arranged in any of a variety of configurations. Details of the various configurations of the message including the civic address are described below with reference to FIG. 5.

Next, at line 412, the apparatus 106 receives the civic address sent from the intermediary device 104. In response to receiving the civic address, the apparatus 106 may send a second acknowledgement signal (ACK #2) to the second network 110 for transmission, in turn, to the intermediary device 104. The second acknowledgement signal may be sent to inform the intermediary device 104 that the apparatus 106 has received the civic address. As an example, the second acknowledgement signal may be arranged as a DTMF D signal. Other examples, of the second acknowledgement signal are also possible.

After the apparatus 106 receives the civic address, the apparatus 106 may present the civic address to a user of the apparatus 106. The apparatus 106 may receive the civic address in a message arranged as FSK signals and extract the civic address from the received FSK signals. After extracting the civic address, the apparatus 106 may present the civic address to a user of the apparatus 106 by displaying the address on a Type-2 Caller ID instrument. The apparatus 106 may use the Type-2 Caller ID instrument to extract the civic address from the FSK signals. Other examples of the apparatus 106 presenting the civic address to a user are also possible.

Next, at line 414, the intermediary device 104 may receive the second acknowledgement signal sent from the apparatus 106. In response to receiving the second acknowledgement signal, the intermediary device 104 may switch from the intermediary-device off-hook state to an intermediary-device on-hook state. The intermediary device 104 may decrease a resistive load between a tip circuit and a ring circuit both connected with the calling mechanism 102 so as to switch between the off-hook and on-hook states.

The functions shown in FIG. 4 may be carried out while the intermediary device 104 is in an active mode. As an example, the intermediary device 104 may operate in the active mode when a civic address is stored in the intermediary device 104. If a civic address is not stored in the intermediary device 104, the intermediary device 104 may operate in a programming mode that allows a user to enter the civic address from the calling mechanism 102. If the calling mechanism 102 is a POTS telephone that can send DTMF tones to the intermediary device 104 to dial a number, the programming mode allows the intermediary device 104 to identify received DTMF tones as a civic address being entered instead of DTMF tones being entered to dial a number. After receiving the civic address, the intermediary device 104 may responsively store the civic address in the data storage 304.

Entities other than the calling mechanism 102 can provide a civic address to the intermediary device. For instance, if the calling mechanism 102 is a POTS telephone, a personal computer in communication with the intermediary device 104 could provide the civic address to the intermediary device 104. As another example, the intermediary device 104 may include a user interface (e.g., a keypad) that allows a user to provide a civic address to the intermediary device 104. Other examples of an entity that can provide a civic address to the intermediary device 104 are also possible.

The intermediary device 104 may store more than one civic address. In this way, a user of the intermediary device 104 may store a civic address for each of a plurality of locations where the user may use the intermediary device 104. For example, if the intermediary device user owns a building with 2 or more distinct civic addresses (e.g., a duplex having a first civic address and a second civic address), then the user may use the intermediary device 104 at the first civic address for a first period of time, then use the intermediary device 104 at the second civic address for a second period of time, and then use the intermediary device at the first civic address for a third period of time. Having more than one civic address stored within the intermediary device 104 allows the user to switch between the civic addresses stored in the data storage without having to re-enter a civic address each time the user changes the location of the intermediary device 104.

If necessary, the intermediary device 104 may be associated with more than one phone number such that each of the more than one civic addresses may be associated with a respective phone number as well.

After storing at least one civic address at the data storage 304, the intermediary device 104 may switch from the programming mode to the active mode. After switching to the active mode, the intermediary device 104 may carry out functions shown in FIG. 4 so as to send a civic address to the apparatus 106.

4. Exemplary Civic Address

Figure 5:
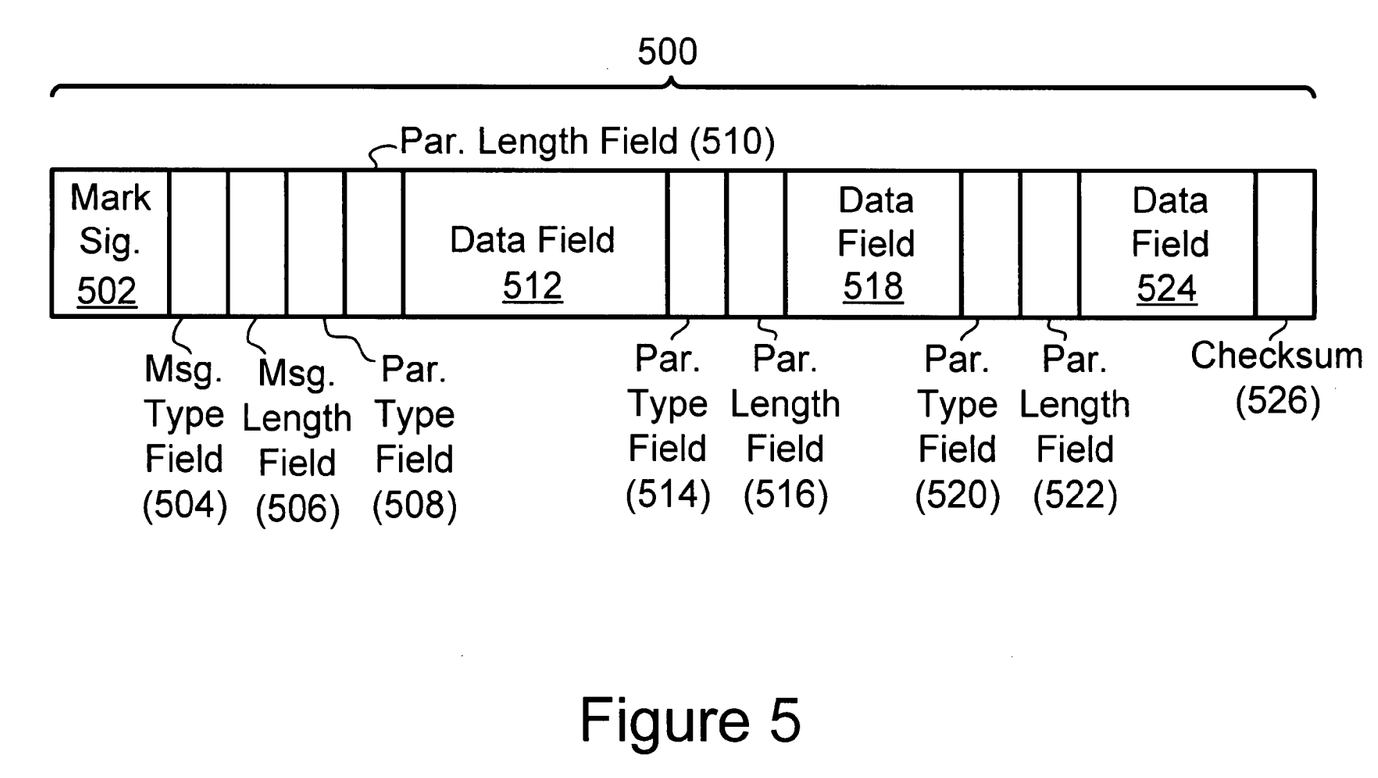
FIG. 5 depicts an exemplary message for conveying a civic address.

Next, FIG. 5 depicts an exemplary message 500 for conveying a civic address from the intermediary device 104 to the apparatus 106. As shown in FIG. 5, the message 500 includes a Mark signal 502, a message-type field 504, a message-length field 506, a first parameter-type field 508, a first parameter-length field 510, a first data field 512, a second parameter-type field 514, a second parameter-length field 516, a second data field 518, a third parameter-type field 520, a third parameter-length field 522, a third data field 524, and a checksum 526.

The message 500 may be arranged in the Multiple Data Message Format (MDMF) in accordance with TIA Standard TIA-777-A, Caller Identity and Visual Message Waiting Indicator Equipment Performance Requirements, May 1, 2003.

A civic address arranged according to MDMF may be sent as FSK signals. FSK is a modulation technique used by modems in which two different frequencies in a carrier signal are used to represent the binary states of 0 and 1. Using FSK, a modem converts the binary data from a computerized system into a binary form in which a logic 1 is represented by an analog waveform at a first specific frequency (e.g., a frequency between 1188 Hz to 1212 Hz) and a logic 0 is represented by an analog waveform at a second specific frequency (e.g., a frequency between 2178 Hz and 2222 Hz).

The Mark signal 502 may include a block of Marks, where each "Mark" is a logical "1" for FSK signaling. As an example, the Mark signal 502 may include between 50 and 300 bits of Mark, or more particularly, a block of 80 bits of Mark.

The message-type field 504 may indicate the message 500 is a particular type of message, such as a "visual message waiting indicator" message. The message-type field 504 may consist of 8 data bits.

The message-length field 506 may indicate the length of the message 500 (in bytes) excluding the Mark signal 502, the message-type field 504, the message-length field 506, and the checksum 526. The message-length field 506 may consist of 8 data bits.

The parameter-type field 508 may include a parameter-type-value that indicates a parameter-type associated with the data field 512. Table 2 includes exemplary parameter-type-values and a parameter-type corresponding to each parameter-type-value. The parameter-type field 508 may consist of eight binary encoded data bits.

TABLE 2

| Parameter-type-values | |
|---|---|
| Parameter-type | Parameter-type-value |
| Date and Time | 01 hex |
| Calling Number | 02 hex |
| Calling Name/Civic Address | 07 hex |

As an example, the parameter-type field 508 may consist of the data bits 00000111 (i.e., 07 hex) so as to indicate the data field 512 consists of data representing a Calling Name or a Civic Address. Previously, the parameter-type-value of 07 hex indicated only a parameter-type of Calling Name. The parameter-type of Civic Address is now associated with the parameter-type-value of 07 hex as well so that existing Type-2 Caller ID instruments are compatible with exemplary embodiments of the invention. In this way, an existing Type-2 Caller ID instrument can display a civic address if the data field 512 includes data representing the civic address.

Alternatively, the parameter-type-value 07 hex may be associated only with a parameter-type of Calling Name, and a parameter-type-value not shown in Table 2, such as 12 hex, may be associated with a parameter-type of Civic Address. In this way, however, existing Type-2 Caller ID instruments that do not recognize the parameter-type-value of 12 hex may not display the civic address.

The parameter-length field 510 may represent a length of the data field 512. The parameter-length field 510 may consist of eight binary encoded data bits. For example, if the parameter-length field 510 represents the length of the data field 512 and if the data field 512 consists of twenty-one data bytes, then the parameter-length field 510 may consist of the data bits "00010101." Other examples of the parameter-length field 510 are also possible.

The data field 512 may consist of data that represents a civic address. The civic address may include any one or more types of civic address information such as a street number, a street name, a street type, and a postal mailing code (e.g., a Zip code). The civic address could include other types of civic address information such as a municipality name. The civic address may consist of twenty-one characters, or a number of characters greater than or less than twenty-one characters.

Preferably, the street type will consist of two characters, and the postal mailing code will consist of five characters.

The data field 512 may include twenty-one octets. As used herein, the term octet refers to an eight-bit data byte. Each octet may be encoded in binary to represent a particular ASCII character. For example, one or more of the octets may represent 41 hex, (i.e., "A" in ASCII), or 20 hex (i.e., " " in ASCII (hereinafter "space character")). Of the twenty-one octets, the first fourteen octets may indicate the street number and street name of the civic address, the next two octets may indicate the street type of the civic address, and the last five octets may indicate the postal mailing code of the civic address.

If the street number and street name, as received from the calling mechanism 102, consist of more than fourteen characters, then the characters after the fourteenth character may not be included in the data field 512. For example, if the calling mechanism 102 provides a civic address consisting of a street number of "1234" and a street name of "Mississippi," then the first fourteen octets of the data field 512 may consist of data representing "1234Mississipp" such that data representing the last "i" is not included in the data field 512. The apparatus 106 can display the civic address as received from the intermediary device 104. In this case, the apparatus 106 can display the street number and the street name as "1234Mississipp."

If the combined street number and street name consist of fourteen alpha-numeric characters, then the first fourteen octets of the data field 512 may not include any space characters. For example, if the calling mechanism 102 provides a street number of "123" and a street name of "Mississippi," then the first fourteen octets of the data field 512 may consist of data representing "123Mississippi."

If the combined street number and street name consist of thirteen alpha-numeric characters, then the fourteenth octet of the data field 512 may consist of data representing a space character. For example, if the intermediary device 104 receives a civic address consisting of a street number "12345," a street name of "Illinois," a street type of "Road," and a mailing code of "56789," then the twenty-one octets of the data field 512 may consist of data representing "12345Illinois Rd56789."

If the combined street number and street name consist of twelve alpha-numeric characters, then the intermediary device 104 may place a first space character before the street type and a second space character before the mailing code. For example, if the intermediary device 104 receives a street number of "1234," a street name of "Illinois," a street type of "Road," and a mailing code of "56789," then the twenty-one octets of the data field 512 may consist of data representing "1234Illinois Rd 56789."

If the combined street number and street name consist of eleven alpha-numeric characters, then the intermediary device 104 may place a space character before the street name, another space character before the street type, and yet another space character before the mailing code. For example, if the intermediary device 104 receives a street number of "123," a street name of "Illinois," a street type of "Road," and a mailing code of "56789," then the twenty-one octets of the data field 512 may consist of data representing "123 Illinois Rd 56789."

If the combined street number and street name consist of ten or less than ten alpha-numeric characters, then the data field 512 may consist of less than twenty-one octets, so as to minimize the length of the data field 512 and the civic address displayed at the apparatus 106. When the combined street number and street name consist of ten or less than ten alpha-numeric characters, the intermediary device 104 may place a space character before the street name, another space character before the street type, and yet another space character before the mailing code. For example, if the intermediary device 104 receives a street number of "12," a street name of "Illinois," a street type of "Road," and a mailing code of "56789," then the data field 512 (having twenty octets) may consist of data representing "12 Illinois Rd 56789."

The parameter-type field 514 may consist of a parameter-type-value associated with a parameter-type for the data field 518. For example, as listed in Table 2, the parameter-type field 514 may consist of a parameter-type-value of 01 hex to indicate that the data field 518 consists of a date and time. The parameter-type field 514 may be encoded in binary using eight data bits (e.g., 01 hex encoded as 00000001).

The parameter-length field 516 may represent a length of the data field 518. The parameter-length field 516 may be encoded in binary using eight data bits. For example, the data field 518 may consist of eight octets such that the parameter length field 516 consists of the data bits 00001000.

The data field 518 may include (i) a month subfield, (ii) a day subfield, (iii) an hour subfield, and (iv) a minute subfield.

The month subfield may be the first subfield of the data field 518 and may consist of two octets. The month subfield represents the current month of the year. The first nine months may have the tens positions filled with zeros so that all months of the year can be represented with two numeric characters (i.e., 01, 02, . . . , 11, and 12). The month subfield may be encoded in 8-bit ASCII with no parity over two octets. For example, the fifth month of the year (05) may be encoded over the two octets of the month subfield as 00110000 00110101. As another example, the tenth month of the year (10) may be encoded over the two octets of the month subfield as 00110001 00110000.

The day subfield may immediately follow the month subfield. The day subfield represents the current day of the month. The first nine days of the month may have the tens position filled with zeros so that all days of the month can be represented with two numeric characters (i.e., 01, 02, 03, . . . , 30, and 31). The day subfield may be encoded in 8-bit ASCII with no parity over two octets. For example, the sixth day of the month (06) may be encoded over the two octets of the day subfield as 00110000 00110110. As another example, the twenty-fourth day of the month (24) may be encoded over the two octets of the day subfield as 00110010 00110100.

The hour subfield may immediately follow the month subfield. The hour subfield represents the current hour of the day in local military time (i.e., 00 (midnight), 01 (1:00 AM), . . . , or 23 (11 PM)). The local time may be designated as the time of the call in the time zone where the intermediary device 104 and/or a wireless local loop associated with the intermediary device 104 is located. The first nine hours of the day may have the tens position filled with zeros. The hour subfield may be encoded in 8-bit ASCII with no parity over two octets. For example, 1:00 AM (01, i.e., $1^{st}$ hour in military time) may be encoded over the two octets of the hour subfield as 00110000 00110001. As another example, the 9:00 PM (21, i.e., $21^{st}$ hour in military time) may be encoded over the two octets of the hour subfield as 00110010 00110001.

The minute subfield may immediately follow the hour subfield. The minute subfield represents the current minute of the current hour (i.e., 00, 01, 02, . . . 58, or 59). The minute subfield may be encoded in 8-bit ASCII with no parity over two octets. For example, 12 minutes after the hour (12) may be encoded over the two octets of the minute subfield as 00110001 00110010. As another example, 54 minutes after the hour may be encoded over the two octets of the minute subfield as 00110101 00110100.

The parameter-type field 520 may immediately follow the data field 518. The parameter-type field 520 may consist of a parameter-type-value associated with a parameter-type for the data field 524. For example, as listed in Table 2, the parameter-type field 524 may consist of a parameter-type-value of 02 hex to indicate that the data field 524 consists of a calling number (associated with the intermediary device 104 and/or the wireless local loop associated with the intermediary device 104). The parameter-type field 520 may be encoded in binary using eight data bits (e.g., 02 hex encoded in binary as 00000010).

The parameter-length field 522 may represent a length of the data field 524. The data field 522 may consist of ten octets for encoding a ten digit phone number (10). The parameter-length field 522 may be encoded in binary using eight data bits and may represent the data field 522 consisting of ten octets as 00001010.

The data field 524 may represent the numeric characters of the calling access line (i.e., the telephone number associated with the intermediary device 104 and/or the wireless local loop associated with the intermediary device 104. The numeric characters of the calling access line are transmitted in order (i.e., the first character of the access line is transmitted first, and the last character of the access line is transmitted last). The data field 524 may be encoded in 8-bit ASCII without parity with one octet per numeric character. For example, if the numeric characters associated with the calling access line is 803 555 9764, then the numeric characters would be encoded over ten octets as 00111000 00110000 00110011, 00110101, 00110101, 00110101, 00111001, 00110111, 00110110, and 00110100.

The checksum 526 may consist of a computed value that can be used to check the integrity of the data (of the message 500) that precedes the checksum 526. As an example, the checksum 526 may be calculated as the 2's complement of the modulo of all the bytes in the message 500 excluding the checksum 526. Other methods for computing checksums known to those of ordinary skill in the art may also be used to compute the checksum 526.

5. Conclusion

Exemplary embodiments of the present invention have been described above. Those skilled in the art will understand, however, that changes and modifications may be made to the embodiments described without departing from the true scope and spirit of the present invention, which is defined by the claims.

I claim:

1. In a system comprising (i) a calling mechanism operable in a calling mechanism on-hook state and operable in a calling mechanism off-hook state, and (ii) an intermediary device operable in an intermediary device on-hook state and operable in an intermediary device offhook state, a method comprising:

switching the calling mechanism to the calling mechanism off-hook state, and responsively switching the intermediary device to the intermediary device off-hook state;

thereafter, using the calling mechanism to dial an emergency number, and responsively establishing a communication via the intermediary device between a Public Safety Answering Point (PSAP) and the calling mechanism;

after establishing the communication and before the intermediary device sends a civic address along with a parameter type value to identify that the civic address is being communicated to the PSAP, switching the calling mechanism to the calling mechanism on-hook state; and after switching the calling mechanism to the calling mechanism on-hook state, sending the civic address from the intermediary device to the PSAP, and thereafter switching the intermediary device to the intermediary device on-hook state, wherein the civic address includes a predetermined number of bytes of data, a first number of bytes representing a street number and street name, a second number of bytes representing a street type, a third number of bytes representing a postal mailing code, wherein the civic address includes twenty-one bytes of data, wherein the first number of bytes are fourteen bytes of data of the twenty-one bytes of data that represent the street number and street name, wherein the second number of bytes are two bytes of data of the twenty-one bytes of data that represent the street type, wherein the third number of bytes are five bytes of data of the twenty-one bytes of data that represent the postal mailing code, and wherein sending the civic address includes sending the fourteen bytes first, then the two bytes of data, and then the five bytes of data.

2. The method of claim 1, wherein the method of claim 1 is carried out while the intermediary device is operating in an active mode, prior to carrying out the method of claim 1 and while the intermediary device is operating in a programming mode, the method further comprising: at the intermediary device, (i) receiving the civic address, and (ii) responsively storing the civic address, and thereafter switching the intermediary device from programming mode to the active mode.

3. The method of claim 2, wherein the intermediary device receives the civic address from the calling mechanism, and wherein the calling mechanism comprises a landline telephone.

4. The method of claim 1, further comprising:

receiving from the PSAP an acknowledgement indicating the PSAP has received the civic address, and wherein the function of switching the intermediary device to the intermediary device on-hook state occurs after receiving the acknowledgment.

5. The method of claim 1, further comprising:

after establishing the communication and before the intermediary device sends the civic address to the PSAP, sending an alert indicator from the intermediary device to the PSAP, and the PSAP responsively sending to the intermediary device an acknowledgment message indicating the PSAP is ready to receive the civic address.

6. The method of claim 1, further comprising:

after sending the civic address to the PSAP and before switching the intermediary device to the intermediary device on-hook state, (i) switching the calling mechanism to the calling mechanism off-hook state so as to allow a caller at the calling mechanism to continue the communication, and (ii) thereafter, switching the calling mechanism to the calling-mechanism on-hook state.

7. The method of claim 1, further comprising the PSAP displaying the civic address, sent from the intermediary device, on a Type-2 caller identification (ID) instrument.

8. An intermediary device comprising:

a communication unit having a first interface for interfacing with a first network that provides connectivity to a calling mechanism, and a second interface for interfacing with a second network that provides connectivity to an apparatus associated with a predefined number;

a processor; and data storage, wherein the data storage contains program logic executable by the processor to (i) detect the calling mechanism dialing the predefined number, and responsively invoke the communication unit to establish a communication with the apparatus associated with the predefined number; and (ii) after the calling mechanism switches to an on-hook state, invoke the communication unit to send a civic address to the apparatus associated with the predefined number, the civic address including a predetermined number of bytes of data, a first number of bytes representing a street number and street name, a second number of bytes representing a street type, a third number of bytes representing a postal mailing code, wherein the civic address includes twenty-one bytes of data, wherein the first number of bytes are fourteen bytes of data of the twenty-one bytes of data that represent the street number and street name, wherein the second number of bytes are two bytes of data of the twenty-one bytes of data that represent the street type, wherein the third number of bytes are five bytes of data of the twenty-one bytes of data that represent the postal mailing code, and wherein sending the civic address includes sending the fourteen bytes first, then the two bytes of data, and then the five bytes of data.

9. The intermediary device of claim 8, wherein the program logic is executable to cause the intermediary device to function in a programming mode, and while the intermediary device is functioning in the programming mode, (i) the calling mechanism sends the civic address to the first interface, (ii) the civic address is received at the first interface, and (iii) the program logic is executable to cause the data storage to store the received civic address.

10. The intermediary device of claim 9, further comprising a display for displaying the civic address as the civic address is received from the calling mechanism so as to allow a user to confirm the civic address received by the intermediary device is correct.

11. In an intermediary device residing in a communication path between a calling mechanism and a wireless local loop, a method comprising:

detecting the calling mechanism dialing a predefined number, and responsively establishing a communication between the calling mechanism and an apparatus associated with the predefined number; and after the calling mechanism has switched to an on-hook state, sending frequency shift keying (FSK) signals to the wireless local loop for transmission, in turn, to the apparatus associated with the predefined number, wherein the FSK signals represent a civic address associated with the calling mechanism and a parameter type value to identify that the civic address is being communicated in the FSK signals, wherein the civic address comprises an address selected from the group consisting of (i) a street number, (ii) a street name, (iii) a street type, and (iv) a postal mailing code, wherein the civic address includes a predetermined number of bytes of data, a first number of bytes representing a street number and street name, a second number of bytes representing a street type, a third number of bytes representing a postal mailing code, wherein the civic address includes twenty-one bytes of data, wherein the first number of bytes are fourteen bytes of data of the twenty-one bytes of data that represent the street number and street name, wherein the second number of bytes are two bytes of data of the twenty-one bytes of data that represent the street type, wherein the third number of bytes are five bytes of data of the twenty-one bytes of data that represent the postal mailing code, and wherein sending the civic address includes sending the fourteen bytes first, then the two bytes of data, and then the five bytes of data.

12. The method of claim 11, further comprising:

prior to detecting dialing of the predefined number, receiving the civic address from the calling mechanism; and storing the received civic address in data storage at the intermediary device.

13. The method of claim 12, further comprising:

displaying the received civic address on a display of the intermediary device so as to allow a user to confirm the received civic address is correct.

14. The method of claim 11, further comprising:

reading the civic address from the data storage and responsively converting the civic address to the frequency shift keying (FSK) signals representing the civic address.

15. The method of claim 11, wherein the apparatus associated with the predefined number is also associated with a Type-2 Caller Identification (ID) instrument, wherein the apparatus provides the received FSK signals to the Type-2 Caller ID instrument, and wherein the Type-2 Caller ID instrument extracts the civic address from the FSK signals provided to the instrument, and responsively displays the civic address.

16. The method of claim 11, further comprising:

after establishing a communication with the apparatus and prior to sending the FSK signals to the wireless local loop, receiving from the apparatus a message indicating the communication between the intermediary device and the apparatus is established.

17. The method of claim 11, wherein the FSK signals further represent a time, and a phone number associated with the wireless local loop.

18. The method of claim 11, wherein the FSK signals are arranged according to a Multiple Data Message Format (MDMF).

19. The method of claim 11, further comprising:

prior to detecting dialing of the predefined number, receiving the civic address from an entity other than the calling mechanism or the apparatus associated with the predefined number;

displaying the received civic address on a display of the intermediary device so as to allow a user to confirm the received civic address is correct; and storing the received civic address in data storage at the intermediary device.

* * * * *